INVENTORS
FERRI CASCIANI
HARRY D. BAUMAN
ROGER S. WILLIAMS

ATTORNEYS

United States Patent Office 3,268,387
Patented August 23, 1966

3,268,387
MANUFACTURE OF CALCIUM CARBONATE
Ferri Casciani, York, Harry D. Bauman, Glen Rock, and Roger S. Williams, York, Pa., assignors to P. H. Glatfelter Company, Spring Grove, Pa., a corporation of Pennsylvania
Filed Aug. 20, 1963, Ser. No. 303,272
13 Claims. (Cl. 162—30)

This invention relates to the production of high quality, pure white calcium carbonate of controlled particle size. Such $CaCO_3$ may be used for many purposes such as a filler in paper, plastics or rubber and as an ingredient in paints and in formulations for coating paper.

The process of this invention is unique in providing a continuous method for the manufacture of high quality $CaCO_3$ combining the carbonation of milk of lime and the reaction between $Ca(OH)_2$ and an alkali metal carbonate, making possible the utilization of the best features of each reaction and avoiding the inherent disadvantages of both. Even when a hot green liquor of the sulfate (kraft) process is used as a source of $Na_2CO_3$, application of our process produces extremely bright, pure white $CaCO_3$ which meets the most exacting color requirements for pigments and coatings. Heretofore no process has been able to produce high brightness $CaCO_3$ from sulfate green liquor and such $CaCO_3$ as was produced from sulfate green liquor was always substandard and off-color, suitable for very limited applications. As will be made clear in the examples, our invention enables a pulp mill to manufacture large quantities of high quality $CaCO_3$ whether for use in the manufacture of fine papers or coated board or for sale.

However, the advantages of our invention are in no wise limited to use by a pulp mill. Production of calcium carbonate by reacting milk of lime with a gas rich in $CO_2$ has been for years a commercially established process. But such prior art involves carbonation of the milk of lime for lengthy periods of time, usually 12 to 18 hours or even longer. During the first hours, the carbonation reaction is highly efficient but as the amount of unreacted $Ca(OH)_2$ decreases, carbonation becomes increasingly inefficient and large amounts of $CO_2$ contact the suspension without reacting. The over-all efficiency with respect to use of $CO_2$ may be as low as 40–50% and an excessively long time is required to convert the last few percent of $Ca(OH)_2$ to $CaCO_3$.

We have found valuable and unexpected advantages resulting from the process of this invention which comprises stopping the carbonation when a relatively large amount of the $Ca(OH)_2$ remains unreacted, said unreacted portion preferably not exceeding about 70% of that originally present, transferring the slurry from the carbonation reaction to a mechanical device, such as a filter, designed to continuously carry out three distinct operations. The first operation consists in separating the solid phase from the liquid phase and forming the solid phase into a layer or mat through which a carbonate-containing solution can pass; in the second operation, an alkali metal carbonate-containing solution is applied to the solid layer or mat and caused to pass slowly through the solids thereof until the conversion of $Ca(OH)_2$ to $CaCO_3$ is complete; the third operation comprises washing the $CaCO_3$ with water or other wash liquid.

By stopping the carbonation while large amounts of unreacted $Ca(OH)_2$ are still present, the efficiency of the reaction with respect to use of $CO_2$ is very high. We have found it to be in excess of 90%, frequently approaching 100%. Moreover, by continuously completing the conversion of $Ca(OH)_2$ to $CaCO_3$ by using a solution of an alkali metal carbonate, such as $Na_2CO_3$, on a filter, enormous savings in time result. We have found that an adequate degree of conversion by carbonation is readily effected in from 30 minutes or less to 1 hour and that it is preferable to react not more than 85% of the $Ca(OH)_2$ originally present, since to react more results in wastage of $CO_2$ and longer reaction times. Since completion of the conversion on a filter requires only about 5 minutes, a process normally requiring 12 to 18 hours has been reduced by the process of our invention to one hour or less.

If a lime slurry, without the initial partial carbonation, is formed as a mat on a filter and $Na_2CO_3$ solution applied as in our invention, the mat immediately changes to a hard, non-porous, nearly impervious solid which remains as essentially unreacted $Ca(OH)_2$ through which the $Na_2CO_3$ solution passes only with great difficulty. But as a result of the partial carbonation, the solid mat produced by the continuous mechanical device remains porous so that the carbonate solution readily passes through. However, we have found that for practical filtering characteristics the initial carbonation preferably is carried out at least to the extent that the solid mixture transferred to the filter contains no more than about 60% $Ca(OH)_2$. This corresponds to a conversion of about 30% of the $Ca(OH)_2$ originally present. At conversions below 30% of the $Ca(OH)_2$ originally present, the filter cake produced becomes substantially less porous and it becomes difficult to pass the carbonate solution therethrough.

Because, when $Ca(OH)_2$ is converted by carbonation to $CaCO_3$, the $CaCO_3$ weighs more than the $Ca(OH)_2$ from which it came, the percent conversion of $Ca(OH)_2$ to $CaCO_3$ is not obvious from the percent $Ca(OH)_2$ in the mixture of $CaCO_3$ and $Ca(OH)_2$ transferred to the filter. The following calculation is given to illustrate this point since percent conversion of $Ca(OH)_2$ will be used throughout the description and examples as a measure of the extent of carbonation.

By the reaction, $Ca(OH)_2 + CO_2 \rightarrow CaCO_3 + H_2O$, 74.1 g. of $Ca(OH)_2$ yields 100 g. of $CaCO_3$, or 1 g. of $Ca(OH)_2$ yields 1.35 g. of $CaCO_3$.

G. of $Ca(OH)_2$ before carbonation _____ 74.1
At 30% conversion of $Ca(OH)_2$:
  (1) G. $Ca(OH)_2$ to $CaCO_3$ .3×74.1 _____ 22.2
  (2) G. $CaCO_3$ produced 22.2×1.35 _____ 30.0
  (3) G. $Ca(OH)_2$ left 74.1—22.2 _____ 51.9
Total wt. of solids after carbonation (2)+(3) __ 81.9
Percent $Ca(OH)_2$ in solid cake after carbonation
  51.9/81.9 _____ 63.3%

It can readily be shown that the percent conversion of $Ca(OH)_2$ to $CaCO_3$ during carbonation is simply calculated from the analysis of the cake transferred to the filter from the relationship:

$$\frac{100-x}{1+0.0035x} = \text{Percent } Ca(OH)_2 \text{ in cake}$$

where $x$=percent $Ca(OH)_2$ converted and both $x$ and percent $Ca(OH)_2$ in cake are given as percents, not as decimals.

While we have found that for good operation on the filter, carbonation should convert at least about 30% of the $Ca(OH)_2$ to $CaCO_3$, giving an initial cake on the filter of about 60% $Ca(OH)_2$, the filtering characteristics are not impaired by carbonating far beyond the minimum 30%. Obviously the greater the degree of conversion by carbonation, the less carbonate solution will be required on the filter and the lower will be the efficiency with respect to use of $CO_2$. As will be discussed shortly we have found other considerations which make a limited carbonation advantageous.

The filterability gained from the initial partial carbonation is not realized by simply mechanically blending $Ca(OH)_2$ and $CaCO_3$ and putting this mixture on a filter for treatment with carbonate solution. Even when such a mixture is initially largely $CaCO_3$ and although the constituent $CaCO_3$ and $Ca(OH)_2$ are of essentially the same particle size, as soon as the carbonate solution is introduced the mat changes to the same sort of hard, impervious solid previously described, rendering conversion of $Ca(OH)_2$ to $CaCO_3$ impractical. This behavior contrasts markedly with that encountered after the initial carbonation described in our invention.

By utilizing a sodium carbonate solution on a filter, or other mechanical device, in our process the disadvantages of the reaction between $Na_2CO_3$ and $Ca(OH)_2$ are avoided or minimized. The reaction

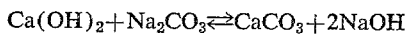
$$Ca(OH)_2 + Na_2CO_3 \rightleftharpoons CaCO_3 + 2NaOH$$

is one which does not take place almost instantaneously as do many inorganic reactions. Existing processes which utilize this reaction to prepare $CaCO_3$ normally mix batches of $Na_2CO_3$ solution and $Ca(OH)_2$ and allow reaction times of at least one hour, and frequently much longer, in order to obtain good yields of $CaCO_3$. A further difficulty encountered is that a chemical equilibrium is reached in these batches so that it is impossible to attain complete conversion of $Ca(OH)_2$ and $Na_2CO_3$ to $CaCO_3$ and NaOH, no matter how long the reaction time allowed and no matter in what proportion the $Na_2CO_3$ and $Ca(OH)_2$ are mixed. It is common practice in these batch processes, after a lengthy reaction time, to separate the $CaCO_3$ and unconverted $Ca(OH)_2$ from the mother liquor and react the mixture with a fresh batch of $Na_2CO_3$ solution to complete the conversion of $Ca(OH)_2$ to $CaCO_3$. A second separation step is then required to obtain the $CaCO_3$.

In contrast, the treatment on a filter of a mixture of the $Ca(OH)_2$ and $CaCO_3$ prepared by proper carbonation subjects the $Ca(OH)_2$ in the mixture to the action of numerous, successive small portions of $Na_2CO_3$-containing solution while simultaneously removing the NaOH-enriched solution produced by the reaction $$Ca(OH)_2 + Na_2CO_3 \rightarrow CaCO_3 + 2NaOH$$

Since the NaOH is continuously removed from contact with the $CaCO_3$ there is little opportunity for the reverse reaction $$CaCO_3 + 2NaOH \rightarrow Ca(OH)_2 + Na_2CO_3$$

to occur and the conversion of $Ca(OH)_2$ to $CaCO_3$ occurs rapidly and completely.

The rapid and complete conversion of $Ca(OH)_2$ on the filter is accomplished by using $Na_2CO_3$-containing solution in considerable excess of that stoichiometrically required. We have found that, as a minimum, a volume of $Na_2CO_3$-containing solution providing about twice the stoichiometric amount of $Na_2CO_3$ equivalent to the $Ca(OH)_2$ in the cake is required on the filter. This means that the filtrate from the second operation on the filter will contain appreciable quantities of unreacted $Na_2CO_3$.

Any convenient method may be used to avoid wasting this unreacted $Na_2CO_3$. The filtrate from said second operation can be recycled until its NaOH content reaches such a level that the desired reaction $$Ca(OH)_2 + Na_2CO_3 \rightarrow CaCO_3 + 2NaOH$$

is too slow. The NaOH-rich solution may then be carbonated by any of well established techniques, thus regenerating the $Na_2CO_3$ and reducing the NaOH content to low levels and the regenerated solution reused on the filter. If the process of this invention is employed in connection with a sulfate pulp mill and the $Na_2CO_3$-containing solution used on the filter is green liquor, the preferred embodiment may be to return the filtrate from the second operation on the filter, without recycling, to the causticizing plant for conversion to white liquor; or the preferred embodiment may be to recycle until the causticity is sufficiently high to send the solution into the white liquor system.

An important objective of this invention is to provide a process whereby plants having ready access to large volumes of $CO_2$-rich gases and lime supplies, can efficiently utilize the $CO_2$ to manufacture high quality $CaCO_3$ by a simple continuous process without the need for long carbonation times and for the large, multiple series of carbonation towers or vessels required to afford lengthy carbonation time. Two examples of such plants are producers of burned lime who wish to produce precipitated $CaCO_3$ as a product commanding a much higher price than limestone or lime, and a pulp mill which desires to produce high quality precipitated $CaCO_3$ for use by an integrated paper mill or for sale or both. In achieving this objective by combining a short carbonation reaction with continuous completion of the reaction utilizing a sodium carbonate solution, other unexpected but highly valuable advantages were realized.

The first of these is concerned with the particle size of the $CaCO_3$ produced. We have found that by the process of our invention, over a wide range, $CaCO_3$ of a desired particle size can be produced by variations in the lime used or by varying the degree of carbonation. In our work, two measures of particle size were used. One was particle size distribution as determined by a sedimentation method using Calgon-T as a dispersing agent. Specific surface was also used as a convenient, quickly determined approximate measure of particle size. We determined specific surface by a modification of the Lea and Nurse method as described by Pechukas and Gage in "Industrial and Engineering Chemistry," Analytical edition, vol. 18, 370–373 (1946). The higher the specific surface, the finer the material. For $CaCO_3$, a specific surface of 40,000 cm.$^2$/g. is equivalent to an average particle size of 0.5 micron.

When carbonating to complete conversion of $Ca(OH)_2$ over lengthy periods, 12–18 hours, the particle size of the $CaCO_3$ varies widely from one batch to another and there is no reliable way to predict or control the particle size of $CaCO_3$ produced. During the extended carbonation a fairly broad distribution of particles results which varies unpredictably from batch to batch. However, by utilizing a short carbonation period followed by essentially immediate completion of the reaction using an $Na_2CO_3$-containing solution by the continuous process of this invention, uniform predictable results are obtained.

With respect to the lime used, the data in Table 1 show that the particle size of the $CaCO_3$ produced according to this invention is directly related to the fineness of the lime employed and that, for a given lime, the higher the degree of conversion by carbonation, the finer the $CaCO_3$ produced. All $CaCO_3$ in Table 1 was prepared by the process of this invention, carbonating to the indicated degree of conversion, and completing the reaction on a filter using a typical sulfate green liquor at 70° C., under conditions described in detail under Examples 1–3.

TABLE 1

| Specific Surface of Lime Used, cm.$^2$/g. | Percent Conversion by $CO_2$ | Time of Carbonation, min. | Specific Surface of $CaCO_3$, cm.$^2$/g. |
| --- | --- | --- | --- |
| 28,500 | 33 | 15 | 22,000 |
| 28,500 | 50 | 30 | 25,900 |
| 35,000 | 52 | 30 | 29,000 |
| 35,000 | 60 | 45 | 31,600 |
| 55,000 | 55 | 30 | 53,000 |
| 55,000 | 65 | 45 | 55,000 |

In the preparation of $CaCO_3$ by the reaction between $Ca(OH)_2$ and $CO_2$, commonly milk of lime is employed. This is prepared by slaking CaO in a large excess of water, usually 3–5 lb. of $H_2O$ to 1 lb. of CaO. Such slaking produces very fine $Ca(OH)_2$ with specific surfaces above 40,000 cm.$^2$/g. Thus the lime in Table 1, specific surface 55,000 cm.$^2$/g. was prepared by slaking CaO in a 5:1 ratio of $H_2O$:CaO. However, the other two limes in Table 1 were so called "dry hydrates" prepared by slaking CaO using from 1.0 to 0.75 lb. of $H_2O$ per lb. of CaO. We have found that by the process of our invention, such dry hydrates can be dispersed in water and used advantageously to prepare $CaCO_3$, particularly where a relatively coarse $CaCO_3$ is desired. Such coarse hydrates normally react very slowly in the late stages of carbonation, but we have found that complete conversion of $Ca(OH)_2$ to $CaCO_3$ is readily effected by our process using $Na_2CO_3$ solution after an initial partial carbonation.

Particle size distribution gives a more descriptive picture of the material than do specific surface values. Table 2 gives typical particle size distribution data for three samples of $CaCO_3$. Sample I was prepared from milk of lime by conventional carbonation, carbonating for 18 hours to achieve essentially complete conversion of $Ca(OH)_2$ to $CaCO_3$. Sample II was prepared by the process of this invention using the same milk of lime, carbonating to 50% conversion, and completing the conversion with hot sulfate green liquor on a filter. Sample III was prepared as Sample II except that a suspension of a dry lime hydrate was used.

TABLE 2

[Percent by weight finer than]

|  | 10 microns | 5 microns | 3 microns | 2 microns | 1 micron |
|---|---|---|---|---|---|
| Sample I | 100 | 92 | 86 | 74 | 40 |
| Sample II | 100 | 96 | 80 | 40 | 6 |
| Sample III | 96 | 81 | 60 | 4 | 0 |

The data in Table 2 show the greater uniformity of particle size resulting from the shortening of the carbonation time from 18 hours to about 1 hour in Sample II as compared with Sample I. Table 2 also illustrates the ability to control particle size distribution according to this invention by using different limes; compare Samples II and III. FIGURE 1 illustrates these differences graphically.

Another important advantage realized by the application of our process is the high brightness of the $CaCO_3$ produced. FIGURE 2 shows the brightness, determined spectrophotometrically compared to MgO=100, for two samples of $CaCO_3$ prepared by the process of this invention, one from milk of lime and one from a dry hydrate, using a typical sulfate green liquor. Very few pigments achieve a brightness of 100 and heretofore it has been impossible, using sulfate green liquor, to prepare $CaCO_3$ having, or capable of developing, e.g., by bleaching with heat or agents, the high degree of whiteness shown in FIGURE 2.

The mixture of $Ca(OH)_2$ and $CaCO_3$ transferred to the filter after the initial partial carbonation of our process is bright white in color. If a sulfate green liquor is used on the filter, the cake quickly turns a typical olive green in color. However, if the $CaCO_3$ cake is dried at 100° C. or above, the green color is completely and permanently destroyed and the dry $CaCO_3$ shows the high degree of brightness illustrated in FIGURE 2. If it is desired not to dry the $CaCO_3$ cake but to reslurry it for use, the green color is easily and immediately destroyed at room temperature by small amounts of bleaching agents such as hypochlorite or hydrogen peroxide. The final brightness is essentially the same whether the $CaCO_3$ is bleached or dried.

The process of our invention will be more clearly understood from the following examples of typical laboratory preparations and a typical illustration integrated with a sulfate pulp mill. All parts and percentages set forth herein are by weight unless otherwise specified.

*Example 1*

A milk of lime was prepared by adding 1000 g. of a high grade, high calcium CaO to 5 liters of cold water. The mixture was thoroughly agitated for one hour and then allowed to cool to room temperature. The slurry was screened through a 100 mesh screen and found to contain 250 g. of $Ca(OH)_2$ per liter. The $Ca(OH)_2$ was found to have a specific surface of 55,000 cm.$^2$/g. 400 ml. (100 g. $Ca(OH)_2$) of the above milk of lime were diluted to 1 liter and put into a carbonator. A 30% $CO_2$–70% $N_2$ gaseous mixture was introduced at the rate of 2100 cc./min. (0.07 c.f.m.) with constant agitation by a mechanical stirrer for 30 minutes. During this time the temperature increased from 25° C. to 33° C. After 30 minutes carbonation, the entire mixture was then filtered to separate the liquid phase from the solid phase. A small sample of the resulting filter cake was dried for analysis.

One liter of sulfate green liquor at 70° C. was filtered through the cake followed by 1 liter of water for washing. The resulting washed cake was removed from the filter and dispersed in water so as to give a slurry of about 40% solids. 15 ml. of a calcium hypochlorite solution containing 0.03 g./ml. available chlorine were added at room temperature with mild agitation to destroy the green color. A sample was dried for determination of specific surface, brightness, and residual $Ca(OH)_2$.

Analysis of the green liquor was: 78.2 g./l. $Na_2CO_3$; 21.1 g./l. NaOH; and 22.3 g./l. $Na_2S$; all expressed as $Na_2O$.

Specific surface of lime used _____ 55,000 cm.$^2$/g.
Time of carbonation _____ 30 minutes.
Weight of $CO_2$ added _____ 35 g.
Percent $Ca(OH)_2$ in filter cake _____ 37.4%.
Percent conversion of $Ca(OH)_2$ during carbonation _____ 55%.
Effective use of $CO_2$ _____ 93.5%.
Specific surface of $CaCO_3$ _____ 53,000 cm.$^2$/g.
Brightness of $CaCO_3$ (457 m$\mu$) _____ 105.
Free $Ca(OH)_2$ in final $CaCO_3$ _____ 0.45%.

*Example 2*

$CaCO_3$ was prepared as in Example 1 except that carbonation was continued for 45 minutes, rather than 30 minutes, and the final $CaCO_3$ was dried without bleaching.

Specific surface of lime used _____ 55,000 cm.$^2$/g.
Time of carbonation _____ 45 minutes.
Weight of $CO_2$ added _____ 51 g.
Percent $Ca(OH)_2$ in filter cake _____ 24.4%.
Percent conversion of $Ca(OH)_2$ during carbonation _____ 69.8%.
Effective use of $CO_2$ _____ 81.5%.
Specific surface of $CaCO_3$ _____ 55,000 cm.$^2$/g.
Brightness of $CaCO_3$ (457 m$\mu$) _____ 104.
Free $Ca(OH)_2$ in final $CaCO_3$ _____ 0.25%.

*Example 3*

Another preparation was carried out by dispersing 105 g. of a high quality chemical grade dry lime hydrate (95% $Ca(OH)_2$) in 1 liter of water. This slurry was carbonated as in Example 1 for 15 minutes. The solids on the filter were treated with 2 liters of green liquor at 70° C. and washed with 2 liters of water. The $CaCO_3$ was dispersed in water and bleached by adding 15 ml. of calcium hypochlorite solution as in Example 1.

Specific surface of lime used _____ 28,500 cm.$^2$/g.
Time of carbonation _____ 15 minutes.
Weight of $CO_2$ added _____ 20 g.
Percent $Ca(OH)_2$ in filter cake _____ 60.0%.
Percent conversion of $Ca(OH)_2$ during carbonation _____ 33%.
Effective use of $CO_2$ _____ 98.5%.
Specific surface of $CaCO_3$ _____ 22,000 cm.$^2$/g.
Brightness of $CaCO_3$ (457 m$\mu$) _____ 99.
Free $Ca(OH)_2$ in final $CaCO_3$ _____ 0.65%.

Example 4

A process for manufacturing high quality $CaCO_3$ in accordance with this invention, integrated into the production of pulp by the sulfate process is illustrated in FIGURE 3.

This pulp mill produces during a typical 24 hour period approximately 225 tons of pulp from a variety of wood, utilizing about 250,000 gallons of white liquor which after use in the digesters is converted in the recovery system to about 225,000 gallons of green liquor containing on the average 1.22 lbs. of $Na_2CO_3$ per gallon. To convert this green liquor to white liquor requires the burning of approximately 130 tons of lime mud per day to produce the required amount of CaO.

The process cycle of this pulp mill is readily modified so as to produce 100 tons per day of high quality $CaCO_3$ as follows.

108 lbs. of dry lime hydrate, 95% $Ca(OH)_2$, and 65 gallons of water per minute are admixed and continuously fed to a carbonator. The lime hydrate selected is of such specific surface as to give $CaCO_3$ of the desired particle size range. In this example lime hydrate having a specific surface of 26,000 to 28,000 cm.$^2$/g. is used. Approximately 25% of the gas stream from the lime kiln, providing about 35 lbs. of $CO_2$ per minute, is carefully scrubbed and fed to the carbonator, wherein it reacts with $Ca(OH)_2$ to partially convert it to $CaCO_3$.

From the carbonator a slurry of partially converted $Ca(OH)_2$ comprising about 130 lbs. of solids per minute, is continuously fed to a rotary filter. The first operation on the filter separates the liquid phase from the solid phase and forms the solid phase into a proper mat or cake for treatment with green liquor. The resulting liquid phase, Filtrate I, comprises essentially a saturated solution of $Ca(OH)_2$ and is returned to be reslurried with lime hydrate going to the carbonator. The cake formed on the filter has an approximate analysis corresponding to 42.5% $Ca(OH)_2$ and 57.5% $CaCO_3$, which in turn corresponds to a conversion of about 50% of the $Ca(OH)_2$ in the carbonator, thus, leaving an amount corresponding to about 51 lbs. of $Ca(OH)_2$ per minute to be reacted with $Na_2CO_3$ of the green liquor, to complete the conversion to $CaCO_3$.

In the second operation on the filter, the cake is treated with green liquor, the entire green liquor output of the pulp mill, about 156 gal./min., being used. This green liquor flow subjects the cake to the action of about 2.5 times the amount of $Na_2CO_3$ stoichiometrically required and, thus, insures rapid and complete conversion of $Ca(OH)_2$ to $CaCO_3$. The filtrate from this operation, Filtrate II, is sent to the causticizing plant for conversion to white liquor, utilizing CaO from the lime kiln as shown in FIGURE 3. Typically the green liquor coming to the filter contains about 1.22 lb./gal. $Na_2CO_3$ and Filtrate II leaving the filter contains about 0.75 lb./gal. $Na_2CO_3$ plus some NaOH.

In the preferred embodiment of our invention, the green liquor is filtered prior to use on the filter, in addition to clarification by a conventional green liquor clarifier, to insure consistent high brightness in the $CaCO_3$ produced. Inorganic or organic flocculating agents can be used to aid the clarification process, and, assuming the clarification system is adequate, there will be no need for supplemental filtration of the green liquor. Likewise, to insure freedom from grit, unburnt core, and other coarse undesirable material in the original lime, it may be preferable to screen or otherwise classify the lime to remove such material. This may be done anywhere in the process, either before carbonation, or after, or, if desired, after the final washing step on the filter.

In the third operation on the filter, the $CaCO_3$ is washed with about 140 gal./min. of water to remove undesirable soluble compounds. The resulting filtrate, Filtrate III, is sent to weak wash storage for use as desired in the pulp mill. The washed cake consists substantially entirely of $CaCO_3$ with only trace amounts of $Ca(OH)_2$ and has a specific surface of about 20,000 to 22,000 cm.$^2$/g. The cake may then be diluted to 20%–50% solids and pumped to a tank for bleaching and storage prior to use in a paper mill, or to drying and grinding, or to storage for shipment to outside customers in slurry or paste form.

In the causticizing operation about 84 tons of $Na_2CO_3$ per day must be converted to NaOH for the digesters, thus producing about 79 tons per day of lime mud to burn in the lime kiln. Production of high quality $CaCO_3$ by the process of our invention, in this example results in a reduction of lime mud to be burned from about 130 tons/day to about 79 tons/day.

Typically, 110 gals. of fuel oil are burned in the lime kiln per ton of CaO produced. Under the conditions of this example, about 44 tons of CaO are produced in the kiln daily, yielding also about 34 tons of $CO_2$ daily. From the combustion of the fuel oil, about 56 tons of $CO_2$ result, bringing the total daily supply of $CO_2$ from the lime kiln to about 90 tons or 125 lb./min.

Conditions and quantities set forth in this example are typical and are in no way limiting. Clearly, for example, carbonation time in the carbonator can be varied widely, thereby changing the percentage conversion of $Ca(OH)_2$ during carbonation and the quantity of $Na_2CO_3$ required on the filter, and, thus, affording a broad range in the capacity to produce high quality $CaCO_3$. Clearly also, sodium carbonate solution can be used rather than green liquor, and other $CO_2$-rich gases, as from a power boiler, can be used in place of lime kiln gas. None of these alters the generic concept of this invention.

Figure 1:
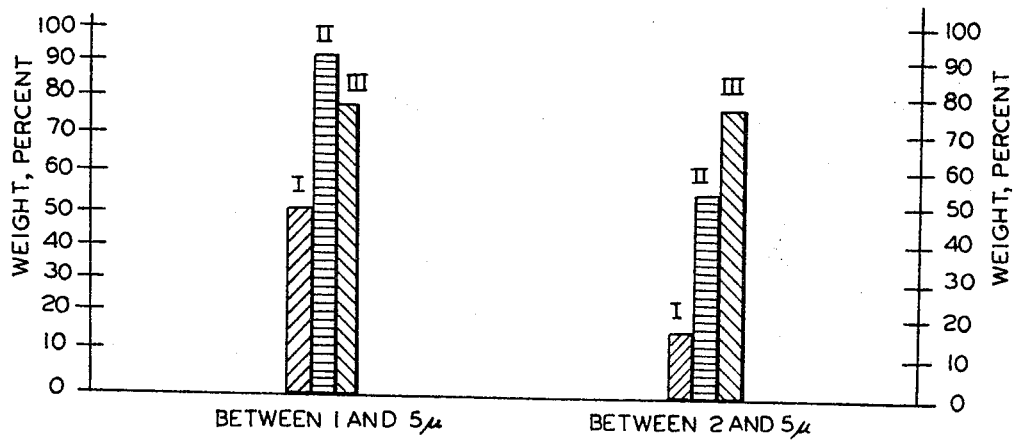
FIG. 1 is a bar graph illustrating the micron size distributions of calcium carbonate produced by conventional methods as compared to calcium carbonate prepared from different limes by the process of the present invention.
Figure 2:
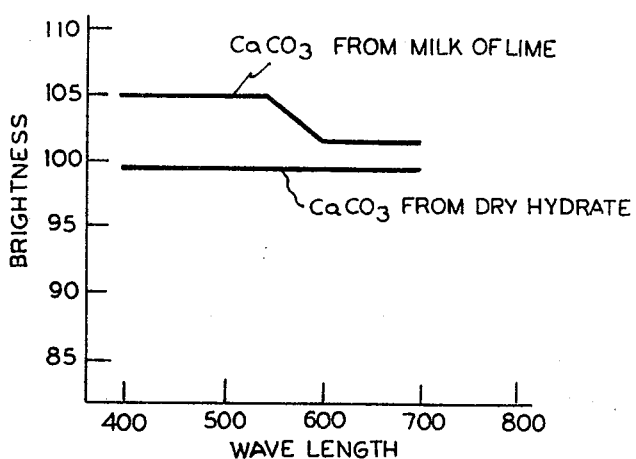
FIG. 2 is a graphic representation of the brightness of two samples of calcium carbonate made by the process of this invention, one using dry lime hydrate, the other using lime slurry, and both employing sulfate green liquor to complete the conversion from lime to calcium carbonate.
Figure 3:
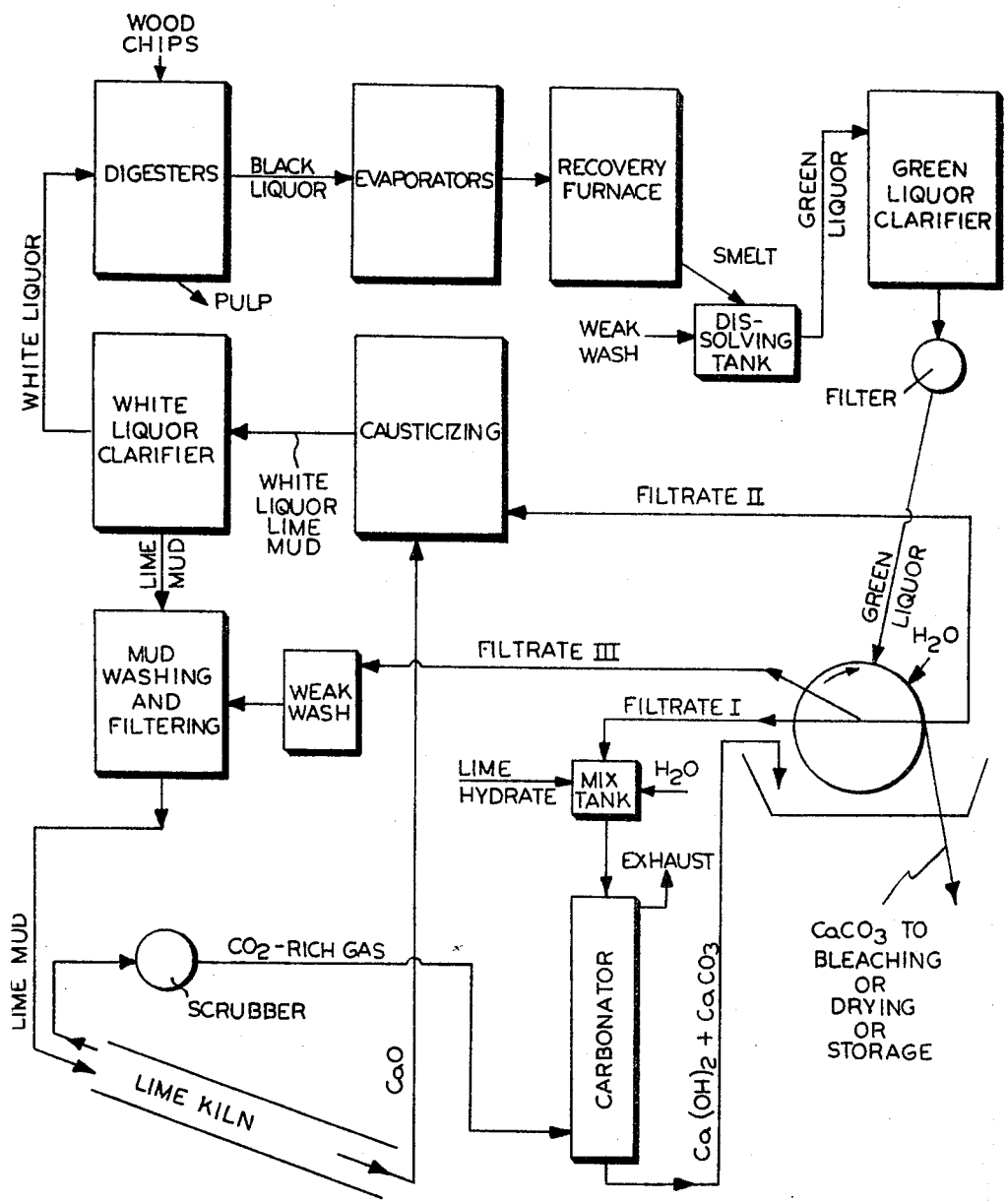
FIG. 3 is a flow diagram of a typical kraft process pulp mill into which calcium carbonate production according to this invention has been integrated.

What is claimed is:

1. A continuous process for preparing calcium carbonate comprising the steps of (1) pretreating a slurry of calcium hydroxide in water with a carbon dioxide-containing gas to react said carbon dioxide with a portion of said calcium hydroxide to initiate a conversion of said calcium hydroxide to calcium carbonate, (2) separating fluid from the resulting pretreated slurry to form a filter cake, (3) contacting said cake with an aqueous solution containing an alkali metal carbonate to substantially complete the conversion of said calcium hydroxide to $CaCO_3$ and form alkali metal hydroxide, and (4) removing alkali metal hydroxide from said cake during said contacting step.

2. The process as claimed in claim 1 wherein said aqueous solution is green liquor from a sulfate pulp recovery operation.

3. The process as claimed in claim 1 wherein said alkali metal carbonate is sodium carbonate.

4. The process as claimed in claim 1 wherein said aqueous solution after contacting said cake is separated from said cake and recontacted with additional cake.

5. In the system of pulping ligneous cellulosic materials with alkali metal base cooking liquors, recovering spent cooking liquors to form green liquor containing alkali metal carbonate in aqueous solution, and causticizing said green liquor to convert same to white liquor for recycle to the pulping step, that improvement comprising, pretreating a slurry of calcium hydroxide in water with a carbon dioxide-containing gas to react said carbon dioxide with a portion of said calcium hydroxide to initiate a conversion of said calcium hydroxide to calcium carbonate, separating fluid from the resulting pretreated slurry to form a filter cake, contacting said green liquor containing alkali metal carbonate with said filter cake to substantially complete the conversion of said calcium hydroxide to calcium carbonate and form alkali metal hydroxide, and removing alkali metal hydroxide from said cake during said contacting step.

6. The improvement as claimed in claim 5 wherein said alkali metal carbonate is sodium carbonate.

7. The improvement as claimed in claim 5 wherein the green liquor after contacting said cake is recycled to said causticizing step.

8. The improvement as claimed in claim 5 wherein the green liquor after contacting said cake is separated from said cake and recycled into contact with additional cake.

9. A continuous process for producing calcium carbonate comprising the steps of (1) continuously moving a slurry of calcium hydroxide through a reaction zone, (2) continuously feeding a carbon dioxide-containing gas to said reaction zone to react said carbon dioxide with a portion of calcium hydroxide to convert not more than 85 percent of said calcium hydroxide to calcium carbonate, (3) continuously separating fluid from the resulting pretreated slurry to form a filter cake, (4) continuously contacting said cake as it is formed with an aqueous solution containing an alkali metal carbonate to substantially complete the conversion of said calcium hydroxide to calcium carbonate and form alkali metal hydroxide, and removing alkali metal hydroxide from said cake during said contacting step.

10. The process as claimed in claim 9 wherein said aqueous solution is green liquor from a sulfate pulp recovery operation.

11. The process as claimed in claim 9 wherein said alkali metal carbonate is sodium carbonate.

12. The process as claimed in claim 9 wherein the resulting calcium carbonate from step (3) is washed with water.

13. The process as claimed in claim 9 wherein said aqueous solution after contacting said cake is separated and recycled into contact with additional cake.

References Cited by the Examiner

UNITED STATES PATENTS 2,105,503   1/1938   Rafton _____ 23—66 X

FOREIGN PATENTS 562,544   7/1944   Great Britain.

OSCAR R. VERTIZ, *Primary Examiner.*

BENJAMIN HENKIN, *Examiner.*

G. OZAKI, *Assistant Examiner.*